Nov. 13, 1923.
T. C. RUSSELL
1,473,645
ELECTRIC HEAT DEVICE
Filed Sept. 18, 1922
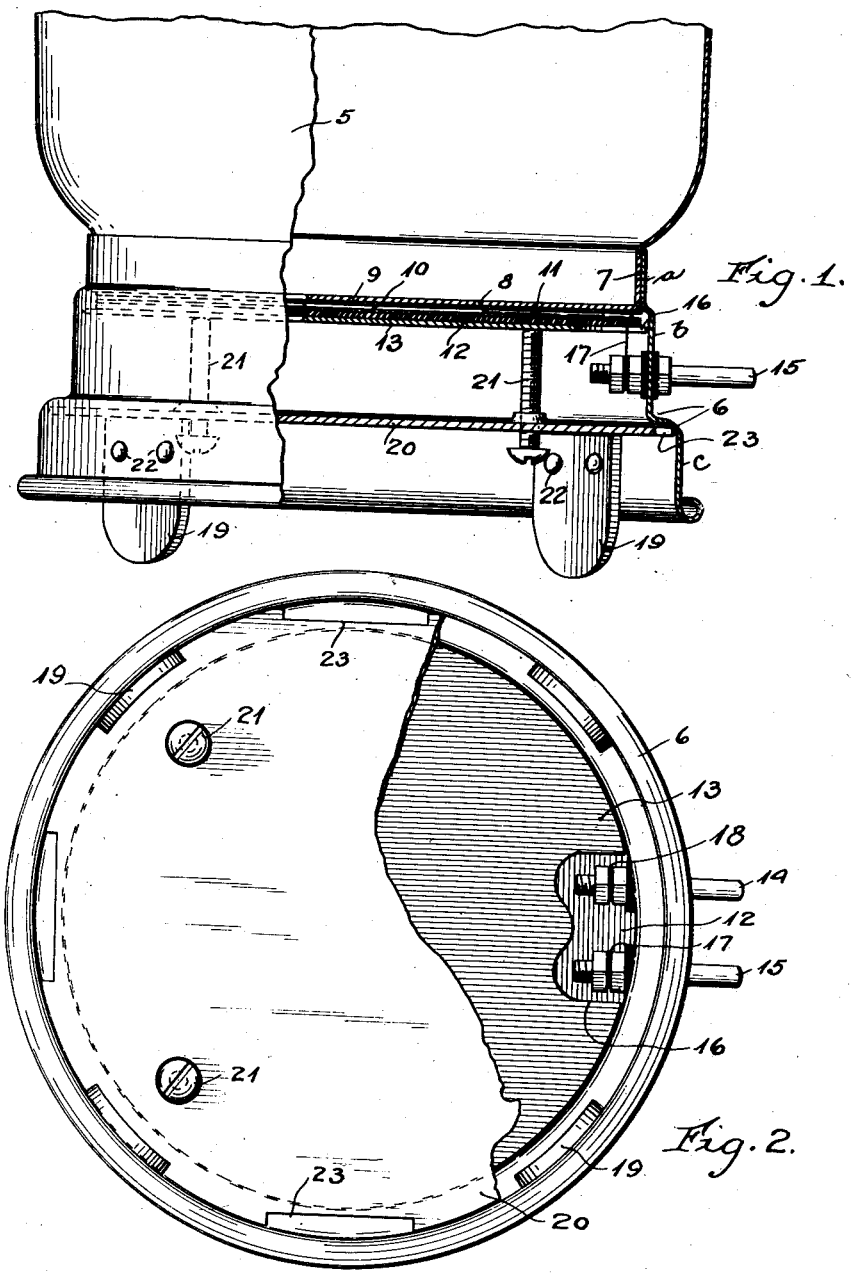
INVENTOR.-
Thomas C. Russell
BY Charles J. Schmidt,
ATTORNEYS.

Patented Nov. 13, 1923.

1,473,645

UNITED STATES PATENT OFFICE.

THOMAS C. RUSSELL, OF CHICAGO, ILLINOIS.

ELECTRIC HEAT DEVICE.

Application filed September 18, 1922. Serial No. 588,813.

*To all whom it may concern:*

Be it known that I, THOMAS C. RUSSELL, a citizen of the United States, and a resident of Chicago, in the county of Cook and State of Illinois, have invented certain new and useful Improvements in Electric Heat Devices, of which the following is a specification.

My invention relates to electric heat devices and in general the object is to provide more practical and efficient means for associating electric heating units with utensils or receptacles to be heated. In order to get the most efficient heating results the heating unit must be intimately associated with a wall of the container whose contents are to be heated, otherwise there will be considerable loss of heat. For example, in coffee pots or percolators, the heating element must be intimately secured against the bottom in order that most efficient heating will result. Heretofore the bottom wall has been more or less cut up or marred in order to secure the heating element in place. Sometimes screws or rivets are used which extend through the container bottom, and a heating element receptacle is inserted into the container through a hole in the bottom. This procedure is expensive and there is also great likelihood that leakage will sooner or later result. An important object of my invention is therefor to provide means for intimately associating an electric heating element with the bottom of the container without in any wise cutting, drilling or tapping the container walls. I utilize a flat heating unit and hold it intimately against the receptacle bottom by means of set screws bearing against a pressure plate applied against the heating unit.

The various features of my invention are incorporated in the construction shown on the accompanying drawing, in which—

Fig. 1 is a side elevational view of the lower part of a utensil with part in vertical diametral section, and Fig. 2 is a bottom view with parts broken away.

The utensil shown may be a coffee pot and has the container 5 and the annular supporting base 6. This base may be secured in any manner. As shown the container has the cylindrical depression 7 forming the flat circular bottom 8, and the base has the upper section *a* which receives the depression 7 and is secured thereto in any suitable manner.

The heating unit may be of the flat type such as is disclosed in my co-pending application Serial 569,091 filed June 17, 1922. It comprises the disks 9 and 10 preferably of mica between which is arranged the resistance conductor 11 preferably in zigzag fashion. The unit is placed with the upper disk 9 against the bottom 8 of the utensil, and a protecting disk 12 of electrical and heat insulating material such as asbestos is laid against the lower mica disk 10. Engaging against this asbestos disk is a pressure plate 13 which is forced with uniform pressure against the heating element to press it securely against the bottom so that the flat resistance winding will be brought as intimately as possible against the bottom 8 with only the thin upper mica disk 9 intervening.

Secured in the intermediate side wall *b* of the base 6 below the heating unit are the terminal posts 14 and 15 extending radially, and to clear the inner ends of these posts and to permit the pressure plate 13 to be readily applied in the base the plate is cut away as indicated at 16, and the terminals 17 and 18 of the heating wire extend through the asbestos disk and through the space 16 and connect with the inner ends of the binding posts. To connect the heating unit in circuit the plug of a suitable connecting cord (not shown) is applied to the outer end of the binding posts, all in the well known manner.

The lower section *c* of the base is of larger diameter than the intermediate section *b* and has secured to it a plurality of blocks 19 of electrical and heat resisting material such as fibre, these blocks forming supporting legs for the utensil. These legs at their upper ends form seating surfaces for the abutment plate 20 through which thread a plurality of abutment screws 21 which engage against the pressure plate 13 to force this plate upwardly to securely clamp the heating unit against the bottom 8 of the utensil. The legs 19 are permanently secured by means of rivets 22, and to permit insertion of the abutment plate past the legs and into position on top thereof the plate is provided with clearance notches 23 spaced to receive the legs when the plate is supplied. After the plate has been brought into a plane above the upper ends of the legs it is turned to bring the unnotched periphery sections thereof into position on the legs and then the screws are turned to engage the pressure plate 13 to securely clamp the heating unit in place. The dead air space between the abutment plate and the pressure plate insulates the heating unit and reduces radiation to a minimum so that practically all the generated heat will be conducted to the utensil bottom and to the contents. The abutment plate also forms a false bottom which protects the heating element and the terminal posts.

My invention greatly simplifies the installation of the heating element, no skilled labor being required. The utensil bottom remains intact and unbroken so that there can be no leakage of moisture from the utensil container to the heating element. If repairs should be necessary on the heating element or it is necessary to insert a new one this can readily be accomplished by merely loosening the screws and turning the abutment plate a sufficient distance to release it from the legs, and after removal of this plate the pressure plate will drop out and the heating element can be readily taken out for inspection, repairs or renewal.

I do not desire to be limited to the exact construction and arrangement shown and described as modifications are possible which would still come within the scope of the invention. I claim as follows:

1. In an electrical heated utensil, the combination of a container, an annular supporting base therefor, a flat electric heating unit within said base applied against the bottom of said container, a pressure plate applied against said unit, an abutment plate below said pressure plate, abutment screws threading through said abutment plate against said pressure plate to cause said unit to be forced into intimate contact with said bottom, there being an insulating air space between said plates, and terminals for said unit in said air space and extending to the exterior of said base.

2. In an electric heat utensil, the combination of a container, an annular supporting base therefor, a flat heating unit applied against the bottom of said container within said base, legs secured against the inner side of said base at the bottom thereof, an abutment plate having notches at its periphery whereby said plate may be shifted upwardly past said legs, said legs having abutment surfaces, turning of said plate after shifting thereof bringing its unbroken periphery into engagement with said surfaces whereby said plate will be supported, and screws threading through said plate and against said unit to securely clamp said unit against said bottom.

3. In an electric heat utensil, the combination of a container, an annular supporting base therefor, a flat electric heating unit applied against the bottom of said container within said base, a pressure plate applied against said unit, supporting legs extending from said base and having seating surfaces at their inner sides, an abutment plate resting on said surfaces below said pressure plate, and screws threading through said abutment plate against said pressure plate to cause said heating unit to be intimately clamped against said bottom, said abutment plate having peripheral notches adapted to be brought into registration with said legs when said plate is turned whereby said plate may be withdrawn from said base.

In witness whereof, I hereunto subscribe my name this 12th day of September, A. D. 1922.

THOMAS C. RUSSELL.